J. OLSON.
BULL STAFF.
APPLICATION FILED MAR. 15, 1916.
1,263,099.
Patented Apr. 16, 1918.
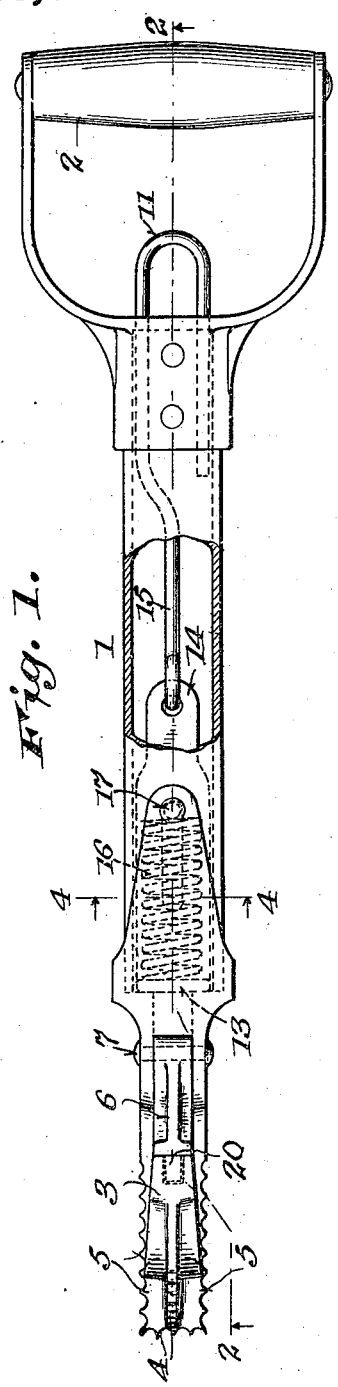
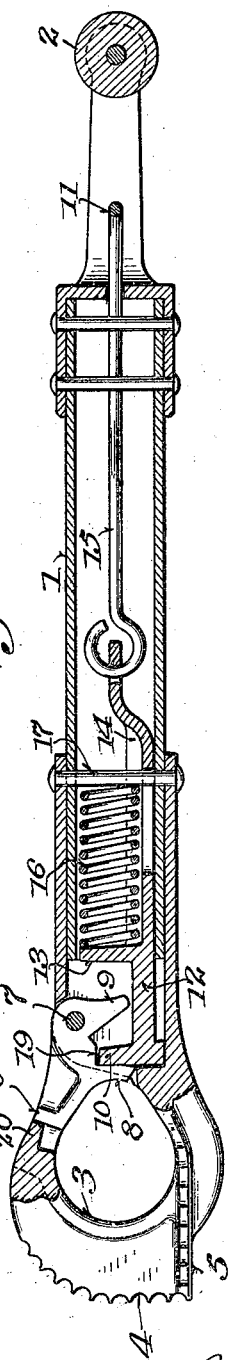
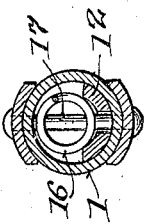
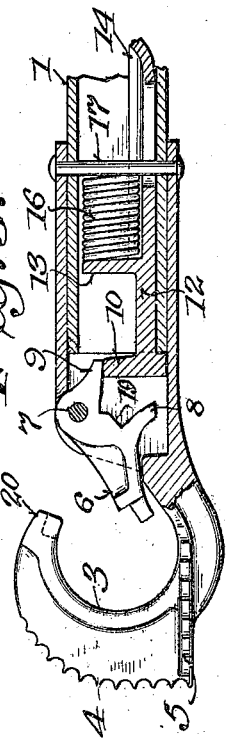
Inventor
John Olson
By Erwin & Wheeler
Attorneys.

UNITED STATES PATENT OFFICE.

JOHN OLSON, OF FORT ATKINSON, WISCONSIN, ASSIGNOR TO JAMES MANUFACTURING COMPANY, OF FORT ATKINSON, WISCONSIN, A CORPORATION OF WISCONSIN.

BULL-STAFF.

1,263,099.  Specification of Letters Patent. Patented Apr. 16, 1918.

Application filed March 15, 1916. Serial No. 84,290.

*To all whom it may concern:*

Be it known that I, JOHN OLSON, a citizen of the United States, residing at the city of Fort Atkinson, county of Jefferson, and State of Wisconsin, have invented new and useful Improvements in Bull-Staves, of which the following is a specification.

My invention relates to improvements in bull staves.

The object of my invention is, among other things, first to provide means for rigidly holding a pivotally supported latch in its closed position across the open side of a hook, whereby the liability of such latch being accidentally moved and opened and whereby its liability to become accidentally disengaged from a ring in a bull's nose is avoided, second, to provide means whereby an attendant may, either by a tilting movement of the staff when in front of the animal, or a twisting movement, when at one side, bring such pressure to bear on the under side of the nose or jaw of the animal, as to cause him to throw his head upwardly, the animal being thereby more easily controlled and disciplined.

My invention is further explained by reference to the accompanying drawings, in which—

Figure 1 is a side view thereof, the interior construction being indicated by dotted lines.

Fig. 2 is a longitudinal section drawn on line 2, 2 of Fig. 1.

Fig. 3 is a similar view to Fig. 2 showing the latch open, and

Fig. 4 is a transverse section drawn on line 4, 4 of Fig. 1.

Like parts are identified by the same reference numerals throughout the several views.

1 is a staff by which the handle 2 is connected with the hook 3. The hook 3 is provided on its extreme front end with a segmental serrated flange 4, the serrations of which form a series of teeth lying substantially in the plane of the hook. The outer or serrated edge of the flange is formed eccentric to said hook, and converges toward the point of the hook. Thus, if the hook is engaged in a ring in an animal's nose, with the point of the hook on the lower side, the attendant may apply the pressure of the teeth of the flange 4 to the animal's nose by tilting the staff to raise the rear or handle end, should the animal attempt to lower his head into a position for a charge upon the attendant. If the position of the hook in the ring is reversed, the attendant may also readily cause the animal to lift his head, by moving the handle end downwardly and simultaneously lifting the staff at an intermediate point. The two opposite sides of said hook are also provided with serrated flanges 5, 5 forming series of teeth lying in a plane at right angles to the plane of the teeth of the flange 4, whereby a twisting movement of said staff will cause said webs to impinge against the animal's nose with great force, when the attendant is at either side of the animal.

A latch 6 is pivotally connected with the staff 1 by a pivotal bolt 7, and adapted to swing inwardly to a releasing position, from the hook closing position. The latch 6 is provided with two inwardly extending lugs 8 and 9, between which is located a reciprocating lug 10, which lug 10 is connected with a loop 11 by the reciprocating slide 12, transversely arranged plate 13, member 14 and rod 15. 16 is an expansive spring which is interposed between the transverse bearing plate 13 and the bolt 17, whereby the lug 10 is held in yielding contact with the lug 8, while it bears against the shoulder 19 of said latch, whereby said latch is rigidly held in its closed position and cannot be forced inwardly until said lug 10 is drawn rearwardly by the manual act of the operator by pulling rearwardly upon said loop 11.

It is obvious that said latch is not only closed by the forward movement of said lug but the same is prevented from being accidentally forced inwardly until said lug has been drawn rearwardly by the manual act of the user. 20 is a stop which is formed integral with or rigidly connected to the end of said hook and serves to limit the outward movement of said latch as the same is brought to its closed position.

Having thus described my invention what I claim as new and desire to secure by Letters Patent, is:—

1. A bull staff, including the combination of a tubular member, provided with a hook at one end thereof, a pivoted latch, adapted, in one position, to close the gap between the hollow member and the open end of the hook, and also adapted to swing inwardly from said position to open the hook, a set of inwardly projecting lugs carried by said latch, a slide mounted in the hollow member, and having a lug engaged between the lugs on the latch, said slide lug being adapted to lock the latch in either the open or closed position, and a slide operating member projecting through the opposite end of the tubular member from that occupied by the hook.

2. A bull staff, including the combination of a tubular member, provided with a hook at one end thereof, a pivoted latch, adapted, in one position, to close the gap between the hollow member and the open end of the hook, and also adapted to swing inwardly from said position to open the hook, a set of inwardly projecting lugs carried by said latch, a slide mounted in the hollow member, and having a lug engaged between the lugs on the latch, said slide lug being adapted to lock the latch in either the open or closed position, a slide operating member projecting through the opposite end of the tubular member from that occupied by the hook, together with a spring, adapted, when the slide actuating member is released, to automatically actuate the slide in a direction to push the latch to hook closing position.

3. A bull staff, including the combination of a tubular member, provided with a hook at one end thereof, a pivoted latch, adapted, in one position, to close the gap between the hollow member and the open end of the hook, and also adapted to swing inwardly from said position to open the hook, a set of inwardly projecting lugs carried by said latch, a slide mounted in the hollow member, and having a lug engaged between the lugs on the latch, said slide lug being adapted to lock the latch in either the open or closed position, and a slide operating member projecting through the opposite end of the tubular member from that occupied by the hook, said latch being adapted to interlock with the open end of the hook when in closing position.

4. A bull staff, including the combination of a tubular member, provided with a hook at one end thereof, projecting from one side of the tubular member, a slide movably mounted in the tubular member, on the side thereof which is provided with the hook, said slide having an inwardly projecting latch operating lug, a latch pivotally connected with the opposite side of the tubular member, and adapted to span the gap between said member and the open end of the hook, a lug on said latch, adapted to be engaged and operated by the lug on the slide, when the latter is retracted toward the opposite end of the tubular member from that provided with the latch, said slide lug, when in retracted position, being adapted to hold the latch lug in a position substantially at right angles thereto, and when in an advanced position being adapted to engage the latch arm, substantially at right angles to the engaged portion of the latch as it swings to final hook closing position.

5. A bull staff, including the combination of a tubular member, provided with a handle on one end, and a hook on the other end thereof, a latch pivotally connected with the tubular member, in a position to close the gap between it and the open end of the hook, and adapted to swing inwardly from such position to an open position within the hook, a slide mounted within the tubular member, a slide operating connection extending therefrom to the vicinity of the handle, and adapted to be manually actuated by a finger or thumb of the hand which grasps the handle, a latch operating projection connected with said slide, and adapted to positively lock the latch in either the closed or open position, and a spring adapted to normally urge the slide toward latch closing position.

6. A device of the class described comprising a staff, a hook at one end thereof, and a series of teeth at the bight portion of the hook, engageable with an animal's nose upon rocking the staff on an animal's nose ring as a pivot.

7. A device of the class described comprising a staff, a hook at one end thereof, and a serrated flange at the bight portion of the hook, said flange being arcuate and taperingly reduced toward one end of said bight portion of the hook.

8. A device of the class described comprising a staff, a hook at one end thereof, a series of teeth at the bight portion of the hook lying in a plane substantially parallel to the plane of the hook and series of teeth carried by the hook at the sides of the first series of teeth, and each lying in a plane intersecting the first named plane.

In testimony whereof I affix my signature in the presence of two witnesses.

JOHN OLSON.

Witnesses:
W. O. JAMES,
LEE ROETHEL.